Figure 1:
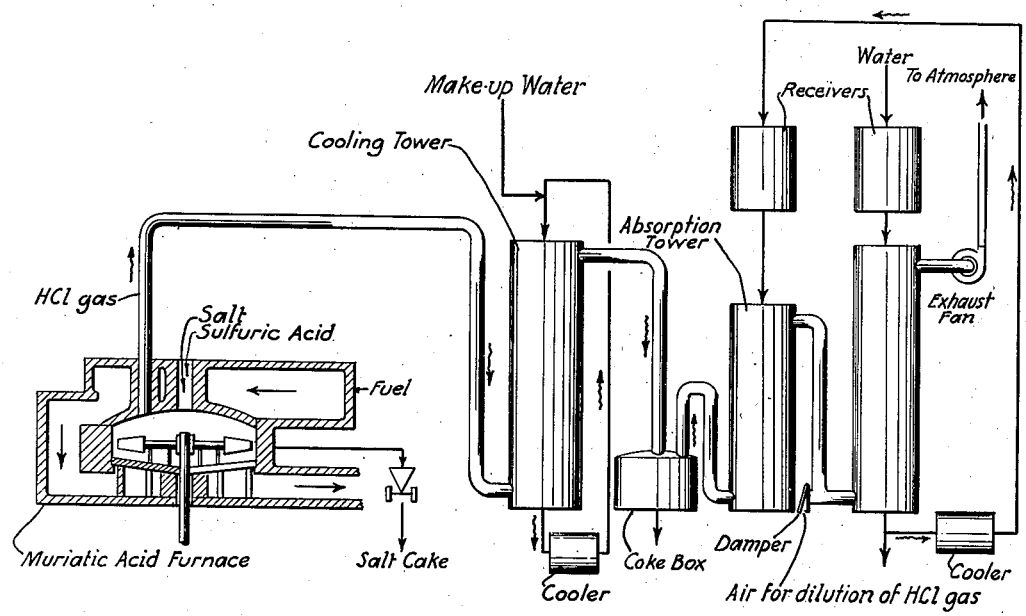

Nov. 5, 1940.                D. M. HURT                2,220,570
                      HYDROCHLORIC ACID ABSORPTION
                        Filed Dec. 27, 1937            3 Sheets-Sheet 1

David M. Hurt   INVENTOR.

BY

Albert B. Griggs.   ATTORNEY

Nov. 5, 1940.   D. M. HURT   2,220,570
HYDROCHLORIC ACID ABSORPTION
Filed Dec. 27, 1937   3 Sheets-Sheet 2

David M. Hurt INVENTOR.
BY
Albert B. Griggs   ATTORNEY

Nov. 5, 1940.   D. M. HURT   2,220,570
HYDROCHLORIC ACID ABSORPTION
Filed Dec. 27, 1937   3 Sheets-Sheet 3
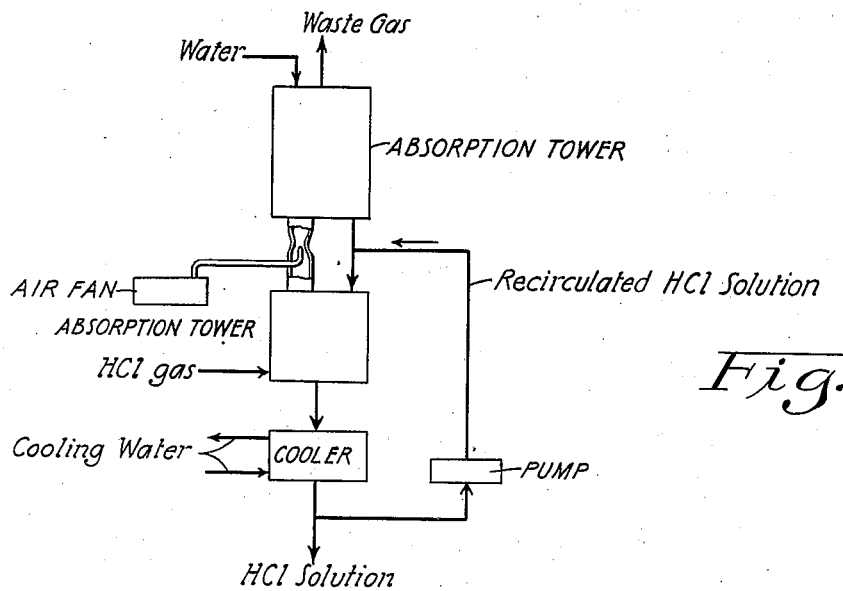
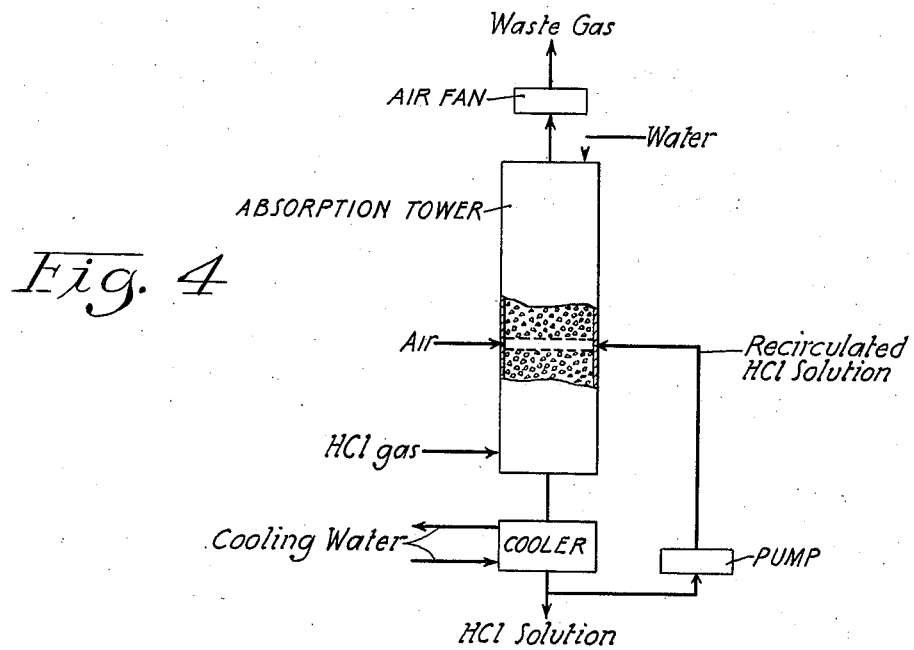
David M. Hurt INVENTOR.
BY
Albert P. Griggs, ATTORNEY Patented Nov. 5, 1940

2,220,570

UNITED STATES PATENT OFFICE 2,220,570

HYDROCHLORIC ACID ABSORPTION

David M. Hurt, Cleveland, Ohio, assignor to E. I. du Pont de Nemours & Company, Wilmington, Del., a corporation of Delaware Application December 27, 1937, Serial No. 181,803

7 Claims. (Cl. 23—154)

This invention relates to processes and apparatus for the absorption of gaseous hydrochloric acid, and is particularly directed to processes and apparatus wherein the heat incident to the absorption of hydrochloric acid is dissipated by contacting the absorbent during absorption with ambient air.

In the absorption of hydrochloric acid gas, the dissipation of the heat of absorption is a major difficulty. The absorbing apparatus must, of course, be constructed of acid resisting material, and the radiation of heat from such apparatus to the surrounding atmosphere is relatively small. Accordingly it is usually necessary to provide some type of cooling means for use in conjunction with the gas-absorbing apparatus.

It has heretofore been the practice to absorb gaseous hydrochloric acid with water in absorption towers of suitable design and, to dissipate the heat of solution of the acid and the sensible heat of the gases, it has been the practice to withdraw and cool a portion of the hydrochloric acid solution produced and then to reintroduce the cooled acid into the tower. To provide adequate cooling it has been necessary to employ apparatus of relatively great size for the cooling of the withdrawn hydrochloric acid solution. Moreover, the acid-resisting materials, such as glass, stoneware, and fused quartz which must be employed for such cooling equipment are expensive, fragile, and of low heat conductivity.

It is an object of my invention to provide simple and economical means for cooling absorption towers for hydrochloric acid gas. It is a further object of my invention to reduce to a minimum the amount of acid-resisting equipment required for the absorption of gaseous hydrochloric acid. Further objects of my invention will appear hereinafter.

I have found that cooling of hydrochloric acid absorption towers may be effected within the tower by introducing ambient air with the hydrochloric acid gas. The use of air dilution is particularly effective on an absorption tower used to make a relatively dilute aqueous solution of hydrochloric acid. By admitting the required amount of ambient air into such a tower, the required cooling is effected and the cooling means heretofore necessary may be eliminated.

Ambient air, which is to say atmospheric air, passed directly into the gas stream effects a certain small amount of cooling by reason of the fact that the ambient temperature is normally lower than the temperature of the hydrochloric acid-containing gas.

The cooling effect attributable to the comparatively low sensible heat of ambient air is relatively small compared to the cooling brought about by evaporation of absorbent. Ambient air is normally drier than the hydrochloric acid-containing gases, which have been contacted with water at relatively high temperatures, and ambient air adiabatically effects cooling simultaneously with the generation of heat of absorption within an absorption tower. In other words, without the withdrawal of heat by any heat exchange medium the temperature within an absorption tower is controlled and the heat of absorption dissipated by contacting the absorbent with dry air and converting water to vapor thus utilizing the great cooling effect of heat of vaporization in situ.

My novel processes and apparatus are characterized by this novel means whereby the temperature of an absorption tower is maintained at a desirably low level by introducing ambient air into a hydrochloric acid-containing gas before absorption whereby the absorbent is cooled adiabatically simultaneously with the generation of heat of absorption.

Figure 2:
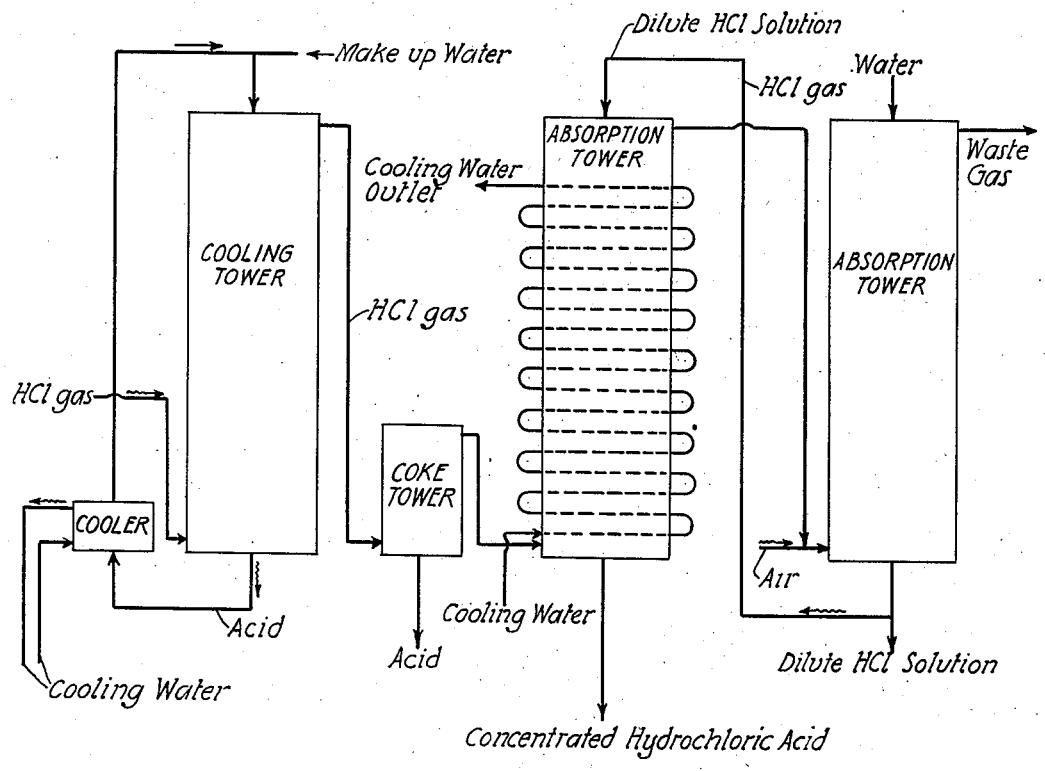

Specific embodiments illustrating the processes and apparatus of my invention are shown in the accompanying drawings wherein:

Figure 1 illustrates in a diagrammatic way a novel apparatus and process according to my invention wherein a first absorption tower is cooled by an external cooling means and wherein air dilution is used as the sole means of cooling of second absorption tower, Figure 2 diagrammatically illustrates a modification of the apparatus and processes of Figure 1 wherein cooling is effected on a first absorption tower by novel internal cooling means, Figure 3 diagrammatically illustrates a modified absorption apparatus including a novel and advantageous means of causing gas circulation, and Figure 4 illustrates a still further modified form of apparatus.

As shown in Figure 1 of the drawings, hydrochloric acid gas is produced by reaction of salt and sulfuric acid, the gas containing in a typical instance fifty per cent HCl. The gas thus produced is conducted to a cooling tower where it is contacted with a counter-current flow of a solution of hydrochloric and sulfuric acid. As is shown, the cooling acid is withdrawn from the bottom of the tower, cooled and returned again at the top of the tower. Make-up water is supplied to the circulating liquid as required.

Hydrochloric acid gas leaving the cooling tower is at a considerably lower temperature than when it entered and it also contains a greater amount of moisture. As a mater of fact, a hydrochloric acid gas at this point is saturated with moisture and carries in addition liquid particles in the form of mist.

To remove particles of liquid from the hydrochloric acid-containing gas, the gas is next passed thru a coke box which serves to filter out liquid from the gas. It will be understood that sulfuric acid is removed from the gas in the cooling tower and that a further and more complete separation is effected in the coke box.

The hydrochloric acid-containing gas emerging from the coke box is led to a first absorption tower in which there is produced a concentrated aqueous solution of hydrochloric acid, usually about 20° Bé. The gases are introduced as shown at the bottom of the absorption tower and flow upwardly to an exit at the top. The heat of absorption is in considerable measure dissipated by cooling the dilute hydrochloric acid solution which serves in counter-current flow as an absorbent for hydrochloric acid.

The hydrochloric acid-containing gas emerging from the first absorption tower is passed to the bottom of a second absorption tower in which it rises upwardly to an exit at the top. Prior to the admission of the gas stream to the second absorption tower there is introduced thereinto ambient air. In the installation illustrated the air from the atmosphere is permitted to enter by means of a damper which may be adjusted depending upon the extent of cooling required.

In the tower the gas and air pass upwardly in counter-current to a flow of water which absorbs hydrochloric acid therefrom to produce acid of around 15 to 17° Bé. The dilute acid solution obtained in the second absorption tower is passed after cooling to the top of the first absorption tower.

The exit gas from the second absorption tower is passed thru an exhaust fan and it has such a low hydrochloric acid content that it may be discharged directly to the atmosphere.

The amount of cooling which must be effected in the second absorption tower will depend upon a number of factors, but I have found that in year-around operation with a commercial set-up as shown it is not necessary to supply further cooling means for this tower.

The amount of ambient air which must be used for dilution of a hydrochloric acid gas to effect the desired amount of cooling will vary widely with variations in operating conditions. In general, the regulated quantity of ambient air introduced into the tower should be great enough, so that the exit gas temperature at the top of the tower will not substantially exceed about 145° F. In normal commercial operation it is preferred that the air dilution be so regulated that temperatures around 130° F. will be maintained at the exit from the second absorber.

The amount of diluting air required will vary with the temperature of the feed water for if the water is at a relatively low temperature, as is frequently the case during the winter, the amount of cooling of the tower required is naturally less.

The amount of air dilution required will of course depend also upon the temperature and HCl content of the gas entering the air dilution tower and the operation of the absorption set as a whole may be considerably varied by throwing a greater or lesser burden upon the first tower. In this connection it is observed that on a year-around basis the second tower carries about forty to eighty-five per cent of the total absorption load.

The considerations as to the amount of ambient air which must be added are substantially those encountered in considerations in the prior art as to the capacity of coolers which would be needed to effect similar results, and one skilled in the art will have little difficulty determining in a particular instance what amount of air must be added for satisfactory operation according to my invention.

Under typical conditions of operation in which an exit gas temperature around 130° F. was maintained and in which a hydrochloric acid-containing gas of about twenty-six per cent HCl was led from the first tower, $1/25$ volume of atmospheric air for each percent of HCl in the gas was used for dilution. The use of about $1/25$ volume or more of ambient air for each percent of HCl in the gas as diluent will be found satisfactory in many commercial installations. It will be understood that this generalization represents only a typical method of operation, and as a matter of fact even much smaller amounts of air may satisfactorily be used for dilution of a hydrochloric acid-containing gas if the feed water is cold and if other conditions are set up so that relatively smaller amounts of cooling are required within the second absorption tower.

It is particularly observed that the illustrated equipment serves the purpose of a similar prior installation having three absorption towers and employing indirect heat exchange coolers to effect the required cooling. In the type of installation heretofore employed, the use of a third clean-up tower is required because the absorbent in the second tower is recirculated acid which does not effectively complete removal of hydrochloric acid from the gas. It is one of the principal advantages of my invention that by the use of ambient diluting air and by thus effecting cooling within the absorption tower I am able to use water at the top of the tower as an absorbent and thus effect substantially complete removal of hydrochloric acid from the gas. A tower cooled according to my invention, therefore, serves at once the function of two such towers as has heretofore been required, the upper portion of the tower serving effectively as a clean-up tower and the lower portion of the tower serving effectively to produce a relatively concentrated acid suitable for a first absorption tower.

In Figure 2 of the drawings there is illustrated a modified apparatus and process according to my invention. Hydrochloric acid gas is first passed thru a cooling tower. The hydrochloric acid-containing gas is preferably obtained by the reaction at elevated temperatures of concentrated sulfuric acid on salt. A gas so produced in a typical instance contained about thirty per cent HCl.

Within the cooling tower there is provided a cooling liquid which flows in counter-current to the gas stream. The cooling liquid is removed at the bottom of the tower, cooled, and returned again at the top of the tower. The acid produced in the cooling tower is a mixture of sulfuric and hydrochloric acids. Make-up water is supplied to the circulating liquid as required.

The hydrochloric acid-containing gas leaving the cooling tower is next passed thru a coke tower in which mist and sulfuric acid are removed from the gas.

The hydrochloric acid-containing gas emerging from the coke tower is led to an absorption tower. A typical gas at this point contained about thirty per cent HCl. The gases, which are still somewhat hot, pass into the absorption tower and flow upwardly therethrough.

The first absorption tower unlike the one shown in Figure 1 is provided with internal cooling means. This internal cooling means, which must be constructed of an acid-resistant material such as glass or fused quartz, conducts a cooling fluid such as water from the bottom of the tower to the top of the tower as shown. A dilute hydrochloric acid solution from the second absorption tower is passed down the first absorption tower, as shown, in counter-current to the gas flow. As will be apparent, the cooling effect of the absorption tower and, consequently, the production of concentrated hydrochloric acid is facilitated.

The hydrochloric acid-containing gas emerging from the first absorption tower is passed to the bottom of a second absorption tower and introduced, together with air, into the second tower. The gas, before dilution, contained about twenty-five per cent HCl, and after dilution contained about ten per cent HCl. The gas and air pass upwardly counter-current to a flow of water which absorbs hydrochloric acid therefrom. The dilute hydrochloric acid solution obtained in this second absorption tower is passed, as hereinbefore indicated, to the top of the first absorption tower.

The cooling tower, coke tower, and absorption towers may be of conventional design. The cooling tower, for instance, may be made of brick, or the like, and packed interiorly with stone or glass elements to increase the surface of contact between gas and liquid. The coke tower, as previously indicated, is packed with coke, and the tower itself may be constructed of stone or other acid-resisting material. The absorption towers may be constructed of stone, and packed with glass rings or the like to increase the available surface for contact between gases and liquids.

In Figure 3 there is illustrated a further modified form of absorption equipment according to my invention. Two absorption towers are provided with communicating means whereby hydrochloric acid solution may pass from the upper tower to the lower. The towers are also provided with communicating means whereby gases from the lower tower may pass to the upper tower. This last mentioned communicating means is provided, intermediate its length, with a venturi, and an air fan forces atmospheric air thru a pipe which terminates within the constricted portion of the venturi.

Below the lower absorption tower there is shown a cooler thru which passes hydrochloric acid solution from the lower tower. This cooler may be of any desired design such as a glass coil surrounded by circulating water. A pump is provided to recirculate cooled hydrochloric acid solution to the top of the lower absorption tower. Means are provided for supplying water to the top of the upper absorption tower and an opening is supplied at the top of the upper absorption tower to permit the escape of waste gases. Means are provided for admitting a hydrochloric acid-containing gas at the bottom of the lower absorption tower, and means are also supplied for withdrawing cooled hydrochloric acid solution.

While the operation of the apparatus of Figure 3 will be evident from the foregoing description of Figures 1 and 2, it is noted that a hydrochloric acid-containing gas, such as the effluent gases of the coke tower of Figure 2 is admitted at the bottom of the lower absorption tower of Figure 3. The hydrochloric acid gas passes upwardly thru the lower absorption tower in intimate contact with dilute hydrochloric acid solution from the upper absorption tower. The gaseous hydrochloric acid is, of course, partially absorbed from the gas mixture, and the dilute hydrochloric acid solution from the upper absorption tower becomes concentrated.

The concentrated hydrochloric acid solution is withdrawn at the bottom of the absorption tower and passed thru a cooler. A portion of the cooled acid solution is returned to the top of the lower absorption tower to cool it.

After partial removal of gaseous hydrochloric acid in the lower absorption tower, the gas mixture passes thru the venturi into the upper absorption tower. Atmospheric air is introduced at the constricted portion of the venturi. The large volume of air thus admitted serves to effect a cooling of the upper absorption tower and, moreover, serves to circulate the hydrochloric acid-containing gas thru the absorption equipment.

The mixture of gases emerging from the venturi into the upper absorption tower pass therethrough in intimate contact with water, and the hydrochloric acid gas is absorbed.

By reason of the introduction of atmospheric air into the venturi, the upper absorption tower is kept relatively cool, and, consequently, the dilute hydrochloric acid solution withdrawn at the bottom of the upper absorption tower is also relatively cool. The cool, dilute acid acts in the lower absorption tower as a cooling medium in addition to acting as an absorbent for more hydrochloric acid gas.

Figure 4 shows a still further modification which is quite similar to that of Figure 3, but a single absorption tower is used which is divided intermediate its height with perforated grids or plates of an acid-resisting material. Atmospheric air is admitted to the absorption tower between the perforated plates, and suitable means are provided, if desired, to insure even distribution of the air.

Cooled, recirculated hydrochloric acid solution is also admitted between the perforated plates, and, again, means may be provided to cause an even distribution of the cool acid solution over the entire area of the lower absorption tower. A fan serves to draw air thru the absorption equipment.

It will be readily apparent to those skilled in the art that my invention is susceptible to numerous modifications. Any desired type of absorption tower may obviously be used. While I have shown sets employing only two absorption towers, it will be apparent that more can be used.

In the specific processes and apparatus shown air is admitted between a first and a second absorption tower. This point of introduction is particularly advantageous as has heretofore been set out because of the advantage of air dilution as a method of controlling the temperatures of a second absorption tower. It will, nevertheless, be understood that air could be introduced at other points in an absorption system without departing from the spirit of my invention.

For instance, air could be introduced at the bottom of the first absorption tower. In this way cooling of the first tower could be effected, but great care must be taken lest the hydrochloric acid-containing gas be so diluted that under the conditions of operation difficulty is encountered in producing an acid of the desired strength.

It will be understood that air should be added after the hydrochloric acid-containing gases have passed thru the coke box. If air were added prior to the cooling tower, for instance, the gases would simply be diluted and would carry a larger quantity of water. The air thus added would be in no sense equivalent to ambient air drier than the hydrochloric acid-containing gases added according to my invention. Air, if added at the furnace not only becomes saturated with moisture later but in addition carries sensible heat from the furnace into the system.

While I have described certain specific apparatus and processes, it will be understood that one skilled in the art without departing from the spirit of my invention, may readily effect adiabatic cooling of an absorbent for hydrochloric acid simultaneously with absorption by contacting the absorbent with ambient air.

This application is a continuation-in-part of my application Ser. No. 746,191, filed Sept. 29, 1934, and of my application Ser. No. 28,412, filed June 26, 1935.

I claim:

1. In a process for the absorption of hydrochloric acid from a moist gas containing the same wherein the gas is absorbed by an aqueous absorbent with evolution of heat and wherein cooling is required, the step comprising effecting at least a part of the cooling simultaneously with the absorption by admixing with the gas stream prior to absorption the predetermined amount of ambient air drier than the gas necessary to effect the cooling required.

2. In a process for the absorption of hydrochloric acid from a moist gas containing the same wherein the gas is absorbed by an aqueous absorbent with evolution of heat, the step comprising cooling the absorbent by introducing into the gas stream prior to absorption ambient air not mixed with water to effect a material part of the required cooling of the absorbent, the amount of air thus added being determined by the amount of cooling required.

3. In a process for the absorption of hydrochloric acid from a moist gas containing the same wherein the gas is absorbed by an aqueous absorbent with evolution of heat, the step comprising cooling the absorbent by introducing into the gas stream prior to absorption ambient air not mixed with water to effect a material part of the required cooling of the absorbent, the amount of air thus introduced being equivalent to about $\frac{1}{25}$ volume or more of ambient air for each per cent of HCl in the gas.

4. In a process for the absorption of hydrochloric acid from a moist gas containing the same, the step comprising absorbing a part of the gaseous hydrochloric acid, passing the hydrochloric acid-containing gas to a second absorption which carries from about forty to eighty-five per cent of the total absorption load, absorbing a further part of the hydrochloric acid content of the gas by contacting it with an aqueous absorbent, and effecting cooling of said second absorption by admixing with the gas prior to said second absorption air not mixed with water to effect a material part of the required cooling of the absorbent, the amount of air introduced being determined by the amount of cooling required.

5. In a process for the absorption of hydrochloric acid from a moist gas containing the same, the steps comprising contacting the gas with a dilute aqueous solution of hydrochloric acid to produce a concentrated aqueous solution of hydrochloric acid, the temperature of absorption being maintained at a satisfactorily low level by cooling said dilute acid by indirect heat exchange, withdrawing the gas from the absorption, contacting the gas of lowered hydrochloric acid content with water to produce a dilute aqueous solution of hydrochloric acid of from about fifteen to seventeen degrees Baumé, the temperature of the second absorption being maintained at a satisfactorily low level using no cooling other than that obtained by admixing with the gas before the second absorption a regulated amount of air.

6. In a process for the absorption of hydrochloric acid from a moist gas containing the same, the steps comprising contacting the gas with a dilute aqueous solution of hydrochloric acid to produce a concentrated aqueous solution of hydrochloric acid, the temperature of absorption being maintained at a satisfactorily low level by cooling said dilute acid by indirect heat exchange, withdrawing the gas from the absorption, contacting the gas of lowered hydrochloric acid content with water to produce a dilute aqueous solution of hydrochloric acid of from about fifteen to seventeen degrees Baumé in a second absorption which carries from about forty to eighty-five per cent of the total absorption burden, the temperature of the second absorption being maintained at a satisfactorily low level using no cooling other than that obtained by introducing into the gas stream prior to absorption air not mixed with water to effect cooling of the absorbent, the temperature being so regulated that exit gas temperatures from the said second absorption do not substantially exceed about one hundred forty-five degrees Fahrenheit.

7. In a process for the absorption of hydrochloric acid from a moist gas containing the same wherein the gas is absorbed by an aqueous absorbent with evolution of heat and wherein cooling is required, the step comprising effecting cooling solely by admixing with the gas stream prior to absorption the predetermined amount of ambient air drier than the gas necessary to effect the cooling required.

DAVID M. HURT.